Feb. 11, 1964 A. M. HARRIS ETAL 3,121,045
CONTROL ROD FOR NUCLEAR REACTOR
Filed Oct. 31, 1960 2 Sheets-Sheet 1
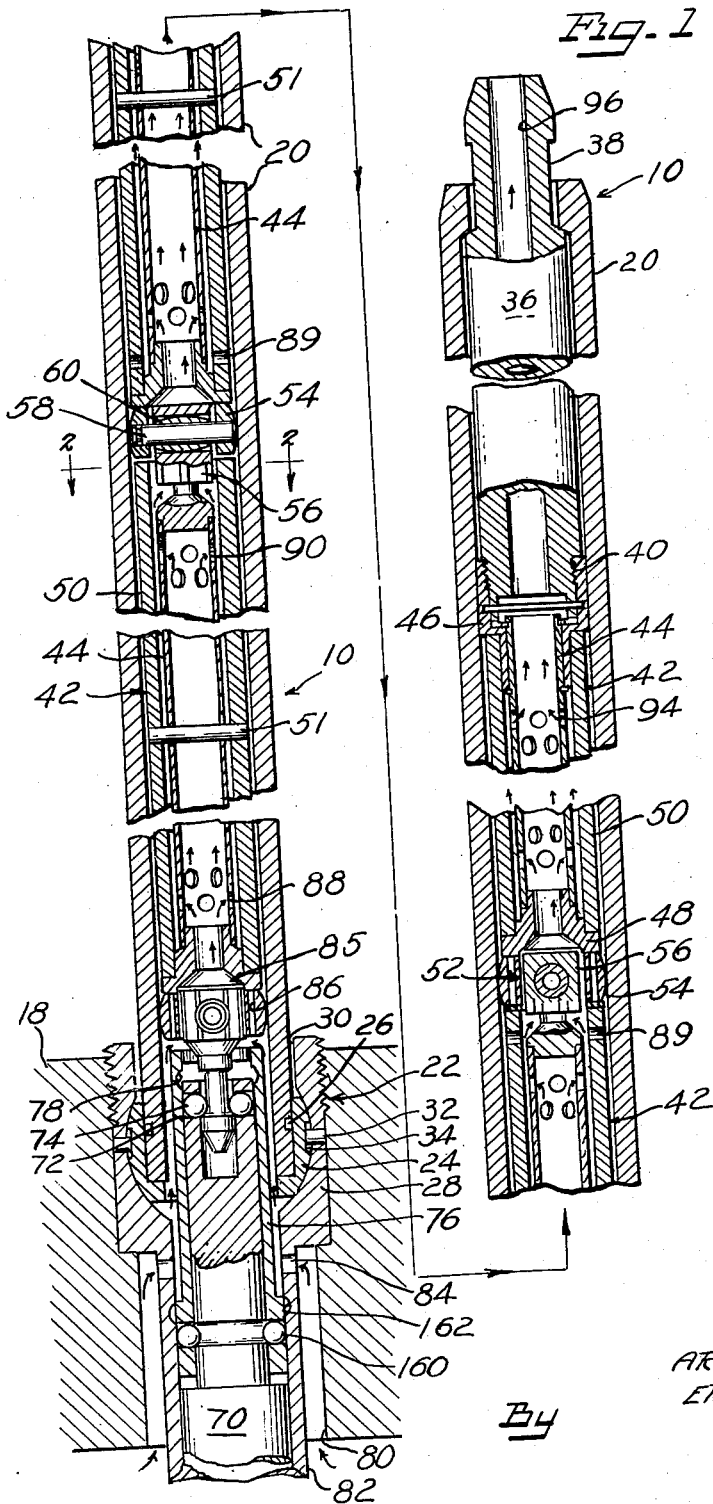
Inventors
ARTHUR M HARRIS
ERIC LEDIN
By
Attys

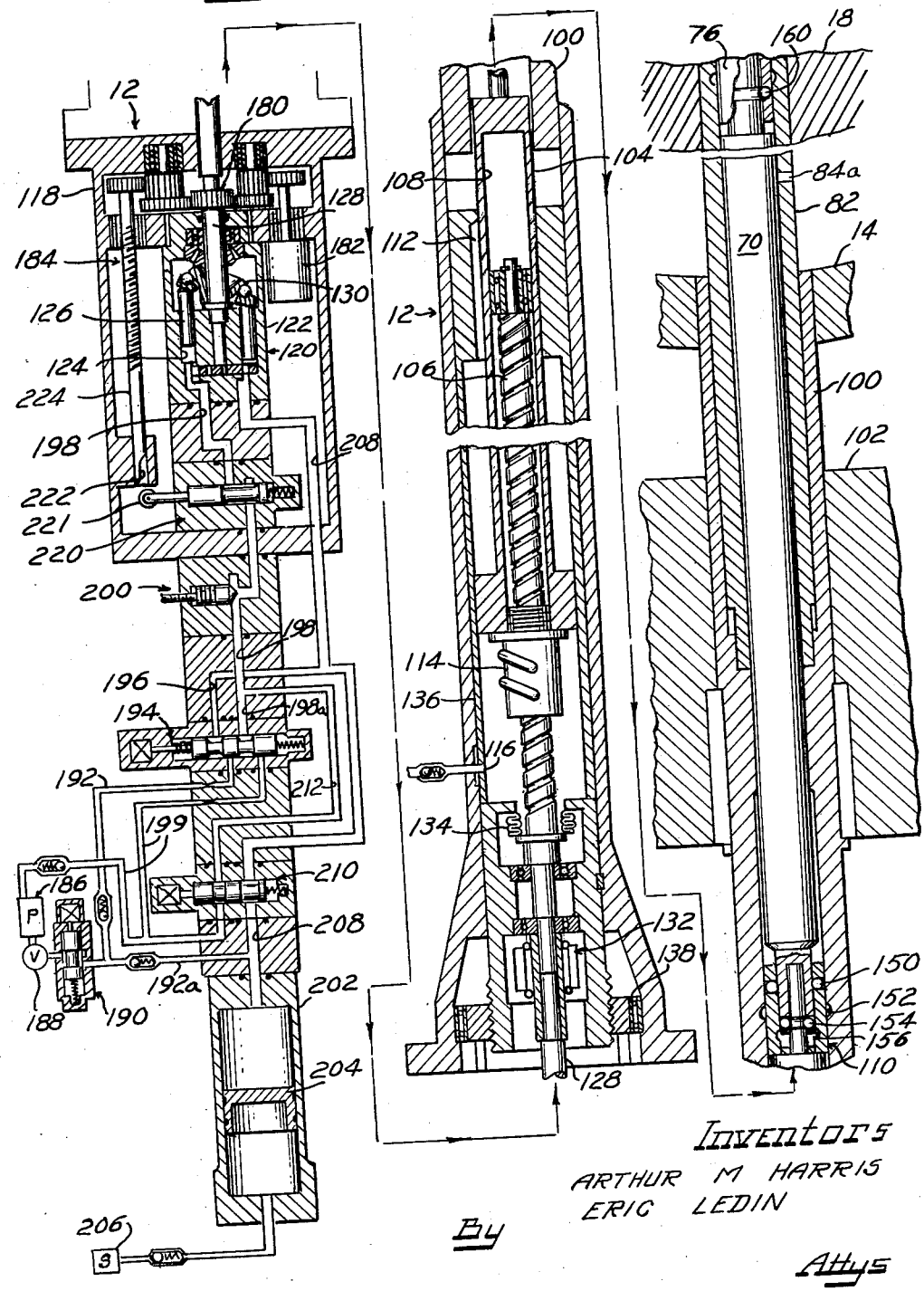

United States Patent Office 3,121,045
Patented Feb. 11, 1964

3,121,045
CONTROL ROD FOR NUCLEAR REACTOR
Arthur M. Harris, San Diego, and Eric Ledin, San Diego, La Jolla, Calif., assignors, by mesne assignments, to the United States of America as represented by the United States Atomic Energy Commission
Filed Oct. 31, 1960, Ser. No. 66,258
6 Claims. (Cl. 176—36)

The present invention relates to a nuclear reactor and is more particularly concerned with an improved construction and arrangement for control rods and the control rod drive mechanism for nuclear reactors.

In a nuclear reactor, there is provided a plurality of control rods which include neutron absorbing or "poison" material and which are disposed for movement relative to a position fully within the reactor core in order to thereby regulate the rate of nuclear reaction within the core. Means are provided for moving the control rods relative to the reactor core, and at least some of the control rods include means for substantially instantaneously driving the control rod into the reactor core in order to "scram" the reactor when an emergency situation exists.

It is the primary object of the present invention to provide a novel and improved form of control rod assembly, which is particularly constructed and adapted to accommodate distortions, expansion and other movements and imperfections present or taking place in the reactor core. A further object of the invention is to provide an improved control rod which is detachably mounted in the reactor vessel, and which is constructed so as to permit angular deviation of the control rod with respect to the vertical axis of the reactor vessel. Still another object of the invention is to provide a control rod of the type described, wherein means is provided for internally cooling the control rod in a manner affording a parallel flow of coolant through the control rod. It is also an object of this invention to provide a novel and improved drive mechanism for control rods utilizing pressure fluid for both regulating movement and "scram" movement of the control rod. Still another object of the invention is to provide an improved control rod drive mechanism, including a hydraulic motor which is operated at one speed for regulating movement of the control rod and which is operable at a substantially greater speed for scramming the control rod in an emergency situation.

Other objects and advantages will become apparent from the following description of the selected embodiment illustrated in the accompanying drawings, wherein:

FIGURE 1 is a cross-sectional view of the control rod, with portions broken away and in section;

FIGURE 2 is a sectional view taken along the line 2—2 in FIGURE 1; and

FIGURE 3 is a cross-sectional view of the control rod drive means, with the hydraulic circuit for the fluid drive means being shown schematically.

The illustrated embodiment includes the control rod assembly, shown in FIGURE 1 and indicated by the numeral 10, and a drive assembly 12 for the control rod, seen in FIGURE 3, which are particularly adapted for use with nuclear reactors of the gas cooled type wherein the reactor vessel is disposed vertically and the control rods are positioned for movement into and out of the reactor core from a position below the core. However, it will become apparent as the description progresses, that various features of the structure described herein may also be used to advantage in connection with other types of nuclear reactors.

In the illustrated embodiment, the nuclear reactor includes a pressure vessel having a bottom wall 14 (FIGURE 3), and intermediate the bottom wall 14 and the reactor core (not shown) containing the fuel elements there is a suitable thermal shield (not shown) and a bottom grid plate 18 which provides a support for the control rod guide tubes. Since the configuration of the pressure vessel and the detailed construction of the reactor core are not essential elements of the present invention it is believed that detailed descriptions of these structures are unnecessary to a proper understanding of the present invention.

With reference particularly to FIGURE 1, it will be seen that the control rod assembly 10 includes an outer sleeve or guide tube 20, which is adapted to extend from the bottom grid plate 18 to a position adjacent the top of the reactor core. The bottom portion of the guide tube 20 has a detachable connection with a supporting bearing or joint 22 carried by the grid plate. As seen in FIGURE 1, the guide tube supporting joint 22 is in the nature of a spherical bearing 24 secured to the lower end of the guide tube 20, through a bayonet connection including pins 26, and the bearing is carried in a mounting 28 which is fixed within the grid plate, to thereby afford angular movement of the guide tube relative to a vertical axis. The upper portion of the bearing mounting 28 includes a circular opening 30 providing sufficient tolerance to accommodate a predetermined amount of tilting movement of the guide tube 20. The amount of tilting is determined by the engagement of a series of lugs 32, or the like, on the bearing mounting 28 with an interrupted groove 34 on the outer surface of the spherical bearing 24. This mounting feature of the guide tube is of importance, particularly in that it permits the guide tube 20, and the control rod contained therein, to yield somewhat to the lateral pressures exerted on the control rod assembly 10 by the adjacent fuel elements which are ordinarily positioned within the reactor core in surrounding relation to the control rod.

The control rod within the guide tube 20 includes an upper reflector portion 36 of graphite or the like, which has a reduced neck portion 38 projecting beyond the upper end of the guide tube 20, in order to permit engagement thereof by a grappler mechanism (not shown) for removal of the control rod assembly 10 from the reactor core. The top reflector portion 36 is suitably connected, as by a screw threaded coupling, indicated at 40, with the upper one of a plurality of control rod sections 42. The control rod sections 42 are disposed throughout the length of the guide tube 20, and each of these sections includes an internal support rod 44, preferably of metal, which includes a pair of enlarged cap portions 46 and 48 at opposite ends thereof for supporting therebetween a neutron absorbing or "poison" material 50, such as graphite with boron carbide, or the like. Additionally, the poison section 50 may be further supported in position by one or more transverse pins 51, which extend through the section 50 and the support rod 44. This poison section 50 is cylindrical in configuration and is disposed with the inner wall thereof disposed in spaced relation to the support rod 44, and the outer wall of the poison material 50 is spaced from the inner wall of the guide tube 20. This arrangement of the neutron absorbing material provides for parallel passage of a gas coolant through the interior of the control rod in a manner to be later described in detail.

The adjacent ends of adjoining pairs of the control rod sections 42 are joined by a knuckle joint 52 or the like, which affords relative movement of the rod sections about a pair of horizontal axes which are disposed generally at right angles to each other. More particularly, the illustrated form of the joint 52 includes a yoke-like member 54 which is fixed to the lower end of one support rod 40 and which presents a generally spherical bearing surface engaging the inner wall of guide tube 20. A generally cylindrical element 56 is fixed to the upper end of the adjacent rod 40; and a pin 58 is disposed through the yoke 54; and a curved bearing 60 mounted in element 56, to thereby provide relative angular movement between the adjoining control rod sections about a pair of horizontal axes. With the described form of construction, the individual control rod sections 42 are in condition for relative movement into positions of misalignment, which may be required because of mechanical variations or tolerances in the components of the rod assembly, because of independent response to differential thermal expansion and the like. Furthermore, the described articulated movement of the control rod sections permits the previously referred to angular tilting movement of the entire guide tube 20 due to lateral pressures exerted thereon by virtue of the weight and/or thermal expansion of the adjoining fuel elements.

As previously indicated, the poison material 50 for the individual control rod sections 42 is disposed in spaced relation to the inner walls of the guide tube 20. The joints 52 intermediate the control rod sections, however, are in sliding engagement with the inner wall of the guide tube. In this way, there is eliminated any frictional forces otherwise existing between the guide tube 20 and the poison material 50; the latter is permitted free expansion; and the only bearing surface affected by vertical movement of the control rod sections within the guide tube is at the knuckle joints.

The lowermost control rod section 42 (FIGURE 1) is detachably connected to the upper end of a push rod 70, through the ball and groove type of latch mechanism seen in FIGURE 1, and this push rod transmits motion from the control rod drive mechanism 12 to the articulated control rod sections 42. More particularly, the upper end of the push rod 70 is provided with a plurality of transverse openings 72 in which are seated ball bearings 74 or the like. An outer sleeve 76 on the push rod normally holds the ball bearings 74 in the inner position seen in FIGURE 1, wherein they provide a locking engagement between the push rod 70 and the lower end of the lowermost control rod section 42. In order to release the control rod assembly from the push rod, the push rod 70 is elevated, by means to be described later, until balls 160 move into groove 162, thereby allowing sleeve 76 to drop down and permit the balls 74 to enter an annular groove 78 in the interior of the upper end of the sleeve 76 after further upward movement of rod 70. In this condition, the control rod is released for movement upwardly away from the push rod. The guide tube 20 can then be rotated about its axis to free its bayonet connection 26 with the sperical supporting bearing 24, and the entire control rod assembly 10 can be moved upwardly through the reactor core in the reactor vessel.

As indicated by the arrows in FIGURE 1, a portion of the primary coolant for the gas-cooled reactor is utilized to also cool the control rod assembly 10. In this respect, the gas coolant which flows below the bottom grid plate 18 enters the opening 80 in the grid plate, which is provided to receive the control rod support bearing and the upper end of the push rod housing 82, and then flows through ports or openings 84 through the push rod housing 82 into the interior of bearing 28. As the coolant flows upwardly it encounters the knuckle joint 85, which is generally similar to the joints 52 and which connects the push rod 70 with the lowermost control rod section 42, at which joint the gas coolant passes through longitudinal grooves 86 formed alongside the internal portion of this joint. At the upper part of the joint 85, the coolant flows into the center of the supporting rod 42. Shortly after the coolant enters the axial portion of the support rod 42, it divides into two paths, with a portion of the coolant continuing axially and internally of the support rod and another portion of the coolant flowing through ports 88 into the space provided between the support rod 44 and the interior wall of the poison section 50. Thus, there is provided two parallel paths through the control rod section for the flow of the coolant, namely, the spaces internally and externally of the support rod walls, respectively. As the gas coolant encounters each knuckle joint 52 in turn, it flows through the interior of the joint in the general manner previously described and then again divides into the parallel paths just mentioned. In this respect, the coolant which has moved upwardly through the center of one of the support rods 44 flows through ports 90 at the upper end thereof, in order to merge with the coolant flowing around the outside of the support rod and pursue a course through the interior of the next knuckle joint 52. Further, it will be noted that the next to the lowermost poison section 50 is provided with ports 89 at opposite ends thereof. These will, of course, permit coolant to flow externally of the poison section, but these ports are provided primarily for the entry of the gas coolant into the control rod assembly from the passage 80 when the control rod is disposed in its lowered position.

As the coolant reaches the upper end of the interior of the control rod assembly 10, the gas coolant merges inside the upper support rod, through the ports 94 in the support rod 44, and then continues its flow upwardly through an axial passageway 96 in the top reflector section 36 to enter the pressure vessel at a position above the control rod.

With the described arrangement, it is seen that there is provided parallel paths of flow internally and externally of the support rods. With the control rod fully inserted as shown in FIGURE 1, the major portion of the coolant will flow through the metal support rods 44, with a somewhat lesser flow externally of the rods. In the event that there is a reduction in primary coolant flow through the core, the reactor of course would be scrammed immediately.

In the event that the control rod is partially or entirely withdrawn from its scrammed position, the coolant flows into the ports 84a (FIGURE 3) in the push rod housing 82 and then through the ports 89 (FIGURE 1) into the interior of the control rod assembly. In such case, of course, the major portion of the coolant would flow upwardly and, therefore, those sections of the control rod subjected to the greater amount of heat would receive the greater cooling effect.

As indicated in FIGURE 1, the lower portion of the control rod support bearing housing 28 is preferably fixed integrally with the push rod housing 82 and forms an extension thereof. The push rod housing extends through the bottom wall 14 of the pressure vessel (FIGURE 3), and the lower end of the housing 82 is disposed within a generally cylindrical housing section 100 which extends through the biological shield 102 for the reactor.

The preferably solid push rod 70 described above, which is connected at its upper end to the control rod, is in turn connected at its lower end to a hollow push rod 104 (FIGURE 3) which receives the lead screw 106 of a screw actuator through its center bore 108. The hollow push rod 104 and the solid push rod 70 are interconnected by a latch mechanism 110 of the ball type previously described, which permits disconnection of the two push rods in response to relative axial movement therebetween. The hollow push rod 104 is keyed or splined to the housing section 136 by means of the spline indicated at 112 in FIGURE 3. Section 136 is in turn keyed to section 100, to thereby prevent relative rotation between the push rod and its housings and thus restrict the push rod 104 to axial movement. The lead screw 106 extends below the hollow push rod 104, and a ball nut 114 is fixed in position on the lower end of the push rod. Consequently, rotation of the lead screw results in axial movement of the two push rod sections 104 and 70 and of the control rod sections 42 connected thereto. Adjacent the lower portion of the housing section 100 for the screw actuator is a transverse passage or port 116 communicating with a source of pressure gas, such as helium, which maintains the interior of the housing 100 at a pressure somewhat greater than that of the coolant in the reactor vessel, to thereby provide for a buffer flow inwardly of the vessel and insure that fission products do not reach the control rod drive. In this respect, it will be understood that suitable passageways are provided for this buffer flow, for example, by providing sufficient tolerance between the push rod and its housing sections.

The control rod drive housing is in two sections, with the upper section comprising the housing 100 referred to above and including the screw actuator and the lower portion of the hollow push rod 104, and a lower housing section 118 containing a hydraulic motor and control valves for regulating flow between a suitable source of pressure fluid and the motor. The hydraulic motor 120 in the illustrated embodiment is of the axial piston type, wherein there is provided a body 122 defining a plurality of parallel chambers 124 therein each containing a piston 126. The motor 120 also includes a central drive shaft 128 supporting a wobble plate 130 which is engageable by the piston 126 to translate the axial movement of the pistons into rotary movement of the pump drive shaft 128. Since this form of motor is known and does not constitute an essential portion of the invention, it is believed that a more detailed description thereof is unnecessary.

The upper end of the motor drive shaft 128 is coupled with the lower end of the lead screw 106 by means of a back-stop clutch 132, such as that presently sold under the designation "Formsprag Rev-Lock" clutch. This form of clutch permits torque to be applied to the lead screw 106 only from the motor drive shaft 128 and, therefore, prevents any back creeping or reversal of the control rods due to conditions existing in the screw actuator or in the control rod assembly 10. The back-stop clutch 132, as well as a rotary face type differential pressure seal 134 at the lower end of the lead screw 106, is disposed in the lower end of an actuator support tube 136, which is slidable in the outer containment or housing 100 but which is selectively axially fixed in position in the housing 100 by means of a vertically adjustable fitting in the form of a support nut 138. This support nut 138 also provides means for releasing the latch mechanism at the upper and lower ends of the solid push rods 70. More particularly, when the separable hydraulic motor housing 118 is removed, the actuator support tube 136 can be moved axially relative to the support nut 138, through rotation of the latter, to thereby raise or lower the entire screw actuator assembly and the push rod 104. Lowering of the actuator assembly and push rod 104 relative to its normal lower stopping point positions latch 110 so that the balls 150 (FIGURE 3) are moved into the grooves 152 and the balls 154 are then moved into groove 156, to permit hollow push rod 104 to be separated from the solid push rod 70.

In order to separate the upper end of the solid push rod 70 from the control rod proper, the support nut 138 is rotated to effect upward movement of the actuator assembly and the lower push rod 104. Referring to FIGURE 1, this upward movement of rod 104 causes push rod section 70 to move upwardly beyond its normal uppermost position until the balls 160 are aligned with groove 162 in housing 82, and further upward movement of rod 70 relative to sleeve 76 causes balls 74 to move into groove 78, thereby separating the push rod and control rod.

The hydraulic motor drive shaft 128 (FIGURE 3) also includes thereon a gear 180, which is connected in driving relation to a position transmitter indicated generally at 182 so as to provide information externally of the reactor and remote therefrom regarding the relative position of the control rod in the vessel. The gear 180 on the motor drive shaft 128 is also connected in driving relation with a deceleration valve screw actuator 184 which is adapted to control the rate of deceleration of the control rod in a manner to be described.

For the operation of the hydraulic motor 120 there is provided, preferably externally of the motor housing 12, a pressure fluid pump assembly 186 including a reservoir for the pressure fluid. The various control valves intermediate the pump and the hydraulic motor 120, as well as the conduits and passages intermediate the pump and the hydraulic motor, are illustrated schematically in FIGURE 3. In this figure, it will be noted that the pump discharge line includes a manual shut-off valve 188 as well as a solenoid operated isolating valve 190.

The isolating valve 190 is normally held open and is intended to be used to isolate the pump from the motor. Downstream from the isolating valve 190, the pump discharge fluid passage branches in two directions, with each branch controlled by a check valve to prevent return flow in the event that the pump 186 fails. One of these branch discharge lines, namely, line 192 leads to a regulating valve 194 which is effective to control the direction of flow to and from the hydraulic motor body 122. The regulating valve 194 is also preferably solenoid operated in opposition to a biasing spring. The downstream side of the regulating valve 194 includes two passages 196 and 198, one of which (198) directs fluid upwardly to the left side of the hydraulic motor and the other directs pressure fluid into passage 203 and to the right side of the motor. The regulating valve 194 is selectively movable from a remote control station to any of three positions to thereby determine the direction of flow into the motor and thus control the direction of rotation of the motor shaft 128. The return flow of pressure fluid entering valve 194 is directed into passage 199 and thence back to the reservoir of the pump system 186. An adjustable flow control valve 200 is disposed in the passage 198 and, as will appear more clearly later in the description, this valve is primarily for the purpose of determining the rate of return flow of the fluid from the motor under scram conditions.

Also disposed in the hydraulic circuit for the control rod drive motor 120, is an accumulator 202 including a piston 204 therein. The accumulator chamber is in fluid communication at its lower end with a suitable source 206 of high pressure fluid, which is preferably a gas, such as helium. The upper portion of the accumulator chamber is in communication through the passage 208 with the hydraulic motor 120, when the valve 210 is open, and is also adapted to receive hydraulic fluid from the pump 186 through the branch discharge passage 192a. The flow of pressure fluid through the passage 208 is controlled by the solenoid operated scram control valve 210, which is normally closed to thereby retain a predetermined pressure in the accumulator chamber and in the passages 192a and the portion of passage 208 upstream of the valve, with the piston 204 approximately midway of the length of the chamber. Under scram conditions, the scram control valve 210 opens and the high fluid pressure in the accumulator chamber 202 is immediately discharged through passage 208 to operate the motor 120 at a very high rate of speed and in a direction to effect scram movement of the control rod 10 into the reactor core. Furthermore, the scram signal releases regulating valve 194 to move to a closed position, by action of its biasing spring, blocking passages 196 and portion 193a of passage 198. The pressure fluid discharged by pump 186 is diverted through passage 192a into passage 208, where it merges with the pressure fluid from the accumulator 202 to aid in the scram operation of the control rod. Under the described scram conditions for the fluid motor system, the return flow from the motor 120 is through the passage 198, past the scram velocity flow control valve 200, through a by-pass passage 212, and through the scram control valve 210 into return passage 199 to the pump 186.

In order to control the deceleration of the control rod 10 toward the end of its stroke, during scram movement of the control rod, there is provided a deceleration valve 220 which is movable to effect the return flow of fluid through the passage 198. More particularly, this valve is illustrated as being a spring biased valve and having a cam follower or roller 221 projecting from the valve housing in position for engagement by a cam 222 at the lower end of the screw actuator 184. As indicated previously, the screw actuator 184 is driven from the motor drive shaft 128, and as the control rod approaches the upper end of its path of travel, the screw actuator 184 has caused its axially extendable screw portion 224 to move downwardly sufficiently for the cam surface 222 to engage the cam follower 221 on the deceleration valve 220. Continued movement of the control rod is accompanied by continued downward movement of the cam surface 222, which, in turn, causes the valve 220 to move inwardly and thereby throttle the return flow of fluid through the passage 198.

It is seen, therefore, that the described arrangement provides for operation of the control rod drive motor 129 at a predetermined regulated speed under the influence of the pump 186 and the regulating control valve 194, and also provides for acceleration of the control rod movement, during a "scram" emergency condition, through use of the pressure fluid which is accumulated in chamber 202 and held in readiness for discharge to the drive motor. In addition to the means described herein, it will be understood that various safety precautions should also be provided, including means for monitoring the position of the piston 204 in the accumulator chamber 202 to determine its readiness, as well as suitable means for otherwise detecting leakage of the pressure fluid in the system.

Although shown and described with respect to particular apparatus, it will be apparent that various modifications of the described structure might be used to advantage and without departing from the principles of this invention. For example, in place of the articulated control rod structure described herein, including the plurality of support rods 44, a single, hollow support rod might extend the length of the control rod within the guide tube 20. In such modification, the support rod will be provided with sufficient flexibility to accommodate the limited tilting of the guide tube 20 described above.

We claim:

1. In a nuclear reactor including a vertically extending pressure vessel, a control rod assembly comprising a tubular guide sleeve mounted in the lower portion of said reactor vessel in an upwardly extending position and in a manner affording limited angular movement of said sleeve about its lower end, a control rod disposed in said guide sleeve and comprising a plurality of elongated neutron absorbing sections interconnected in a manner affording angular movement therebetween, a push rod releasably connected to the lower end of said control rod and extending downwardly from said vessel in generally axially extending relation to said guide sleeve, control rod drive means connected to the lower end of said push rod, said drive means comprising a rotatable drive shaft, a reversible hydraulic motor connected with one end of said drive shaft, a screw drive means interconnecting the other end of said drive shaft with said push rod in a manner affording axial movement of the latter in response to rotary movement of the former, a source of pressure fluid, passage means connecting said source with said motor, a first control valve disposed in controlling relation to said passage means and operable to direct the pressure fluid so as to afford selective rotation of said motor in either direction at a predetermined first speed, a pressure fluid accumulating chamber in fluid communication with said passage means, and a second control valve disposed in controlling relation to the discharge side of said accumulating chamber and operable to release pressure fluid from said chamber into said passage means, to thereby operate said motor and effect upward movement of said control rod at a speed considerably greater than said first speed.

2. In a nuclear reactor having a vertically disposed pressure vessel, a control rod assembly comprising a tubular guide sleeve, a control rod disposed in said guide sleeve, means mounting said guide sleeve and control rod in said reactor vessel in a manner affording limited angular movement thereof about the lower end of said sleeve, a push rod releasably connected to the lower end of said control rod and extending downwardly from said vessel in generally axially extending relation to said guide sleeve, control rod drive means connected to the lower end of said push rod, said drive means comprising a rotatable drive shaft, a reversible hydraulic motor connected with one end of said drive shaft, a screw drive means connected with the lower end of said push rod in a manner affording axial movement of the latter in response to rotary movement of the former, a backstop clutch mechanism connecting said screw drive means with the other end of the motor drive shaft, a source of pressure fluid, passage means connecting said source with said motor, a regulating valve disposed in said passage means and operable to direct pressure fluid therein so as to afford selective rotation of said motor in either direction at a predetermined first speed, an additional source of accumulated pressure fluid in communication with said passage means, and a scram control valve in position to connect said additional source with said motor in a manner affording selective rotation of said motor in a direction providing for upward movement of said control rod at a speed considerably greater than said first speed, so as to scram said rod to its full position within the core of said nuclear reactor.

3. For use with a control rod in a nuclear reactor, a control rod drive means comprising a fluid operated motor having a rotatable drive shaft, means for connecting said drive shaft with the control rod comprising a screw actuating means operable to translate rotary movement of said drive shaft into axial movement of the control rod, a backstop clutch mechanism connecting said motor drive shaft with said screw actuating means so that torque can be applied to the latter only by said drive shaft, a source of pressure fluid, passage means placing said source in fluid communication with said motor to direct the exchange of fluid therebetween, a directional control valve disposed in said passage means and operable to selectively direct pressure fluid between said source and said motor and thereby effect rotation of said drive shaft in a selected direction, an accumulator chamber having fluid therein under pressure and having a fluid discharge opening in communication with said passage means, and a scram control valve disposed and operable to control the flow of fluid through said discharge opening.

4. Control rod drive means comprising a fluid operated motor including a rotatable drive shaft, a source of pressure fluid, a first passage means placing said source in communication with said motor to direct the exchange of pressure fluid therebetween, a directional control valve disposed in said first passage means and operable to selectively direct pressure fluid to said motor to effect rotation of said drive shaft in either direction as desired, an accumulator chamber, a piston in said accumulator chamber, expandable pressure fluid in said chamber on one side of said piston, a second passage means placing the other side of said piston in fluid communication with said hydraulic motor and by-passing said directional control valve, a scram control valve in said second passage means in position to control the flow of pressure fluid between said accumulator chamber and said motor, a scram deceleration valve in said first passage means in position to throttle the return flow of fluid from said motor, and means connecting said drive shaft with said deceleration valve in a maner affording movement of said deceleration valve to a predetermined throttling position after the drive shaft has moved a predetermined number of rotations in one direction.

5. Control rod drive means comprising a reversible fluid operated motor including a rotatable drive shaft, a source of pressure fluid, a first passage means placing said source in communication with said motor to direct the exchange of pressure fluid therebetween, a directional control valve disposed in said first passage means and operable to selectively direct the flow of pressure fluid between said source and said motor so as to effect rotation of said drive shaft in either direction as desired, an accumulator chamber, a piston in said accumulator chamber, means providing expandable pressure fluid in said chamber on one side of said piston, a second passage means placing the other side of said piston in fluid communication with said hydraulic motor and by-passing said directional control valve, and a scram control valve in said second passage means in position to control the flow of fluid between said vessel and said motor, and means connecting said drive shaft with said deceleration valve in a manner affording movement of said deceleration valve to a predetermined throttling position in the return flow passage from the motor after the drive shaft has moved a predetermined number of rotations in a predetermined direction.

6. A control rod assembly comprising a guide tube adapted to be mounted at its lower end within a nuclear reactor vessel in generally vertically extending relation thereto, a control rod disposed in said guide tube and comprising a plurality of elongated sections, joint means interconnecting said elongated sections in a manner affording articulated movement therebetween, said joint means having a sliding fit with the interior wall of said guide tube and having a passage therethrough affording the flow of fluid longitudinally of said guide tube and between opposite sides of said joint means, and each of said sections including an axially disposed hollow support rod, a generally tubular element containing neutron absorbing material and disposed in co-axial spaced relation to said support rod and said guide tube, and including transverse passages through said support rod at opposite ends thereof, whereby a gas coolant within said guide tube is enabled to flow in generally parallel paths through said support rod and between said support rod and said tubular element.

References Cited in the file of this patent

UNITED STATES PATENTS

| | | |
|---|---|---|
| 1,025,884 | Schmitt | May 7, 1912 |
| 1,983,368 | Hathorn | Dec. 4, 1934 |
| 2,852,456 | Wade | Sept. 16, 1958 |
| 2,937,984 | Chapellier | May 24, 1960 |
| 2,975,119 | Emmons | Mar. 14, 1961 |
| 3,009,868 | Moulin | Nov. 21, 1961 |
| 3,018,240 | Bevilacqua et al. | Jan. 23, 1962 |
| 3,020,887 | Hobson et al. | Feb. 13, 1962 |
| 3,025,226 | Martin et al. | Mar. 13, 1962 |

OTHER REFERENCES

Control of Nuclear Reactors and Power Plants, McGraw-Hill, 1955, by Schultz, pages 98–123, particularly FIGS. 5–1, 5–3, 5–4, 5–11, 5–17, and 5–18.